United States Patent [19]
Prather

[11] Patent Number: 5,924,507
[45] Date of Patent: Jul. 20, 1999

[54] POWERED TOY VEHICLE WITH CONTAINMENT SYSTEM

[76] Inventor: Cynthia D. Prather, 3091 Crabapple Dr., Decatur, Ga. 30034

[21] Appl. No.: 08/832,244

[22] Filed: Apr. 3, 1997

[51] Int. Cl.[6] ................................................. B60T 7/00
[52] U.S. Cl. ........................................ 180/167; 180/168
[58] Field of Search ................................ 180/165, 168, 180/166, 167, 430; 446/73, 81, 94; 701/23

[56] References Cited

U.S. PATENT DOCUMENTS

| | | | |
|---|---|---|---|
| 4,993,983 | 2/1991 | Kurita et al. | 446/94 |
| 5,046,981 | 9/1991 | Roddy | 446/81 |
| 5,101,351 | 3/1992 | Hattori | 180/167 |
| 5,292,275 | 3/1994 | Swisher et al. | 446/409 |
| 5,503,059 | 4/1996 | Pacholok | 180/167 |
| 5,547,412 | 8/1996 | Wilcox | 446/73 |
| 5,774,069 | 6/1998 | Tanaka et al. | 180/167 |
| 5,805,057 | 7/1998 | Eslaminovin | 180/167 |
| 5,816,352 | 10/1998 | Hacker | 180/167 |

*Primary Examiner*—Richard M. Camby
*Attorney, Agent, or Firm*—Joseph N. Breaux

[57] ABSTRACT

A powered toy vehicle with containment system that includes a powered toy vehicle that can be driven by a child in a forward and in a reverse direction that includes a direction control switch for selecting from a forward drive capacity or a reverse drive capacity of a reversible electric drive motor; and a containment system including a radio antennae perimeter defining system including at least one radio antennae, for transmitting a perimeter defining signal at a first predetermined frequency, and a radio receiving circuit, tuned to receive the first predetermined frequency and detect the perimeter defining signal and that includes a control output in controlling connection with a motor control relay circuit, the motor control relay circuit disabling the forward drive capacity of the reversible electric drive motor during the entire period when the radio receiving circuit detects the perimeter defining signal and enabling the forward drive capacity of the reversible electric drive motor when the perimeter defining signal is not detected by the receiving circuit. In a preferred embodiment, the toy vehicle is provided with a radio controlled alarm relay circuit activated by a hand held transmitter, the alarm really being connected in series between the battery and the reversible electric motor in a manner such that when the alarm relay is open all power is disconnected from the reversible electric motor.

5 Claims, 3 Drawing Sheets

POWERED TOY VEHICLE WITH CONTAINMENT SYSTEM

TECHNICAL FIELD

The present invention relates to a battery powered child's vehicle that can be driven by a child and more particularly to a battery powered child's vehicle that can be driven by a child in a forward and in a reverse direction that includes a direction control switch for selecting from a forward drive capacity or a reverse drive capacity of a reversible electric drive motor and that further includes a containment system including a radio antennae perimeter defining system including at least one radio antennae for transmitting a perimeter defining signal at a first predetermined frequency, a radio receiving circuit that is tuned to receive the first predetermined frequency and detect the perimeter defining signal and that includes a control output in controlling connection with a motor control relay circuit, the motor control relay circuit disabling the forward drive capacity of the reversible electric drive motor during the entire period when the radio receiving circuit detects the perimeter defining signal and enabling the forward drive capacity of the reversible electric drive motor when the perimeter defining signal is not detected by the receiving circuit.

BACKGROUND OF THE INVENTION

Children often enjoy driving small, child sized, electrically powered vehicles. Because children enjoy driving these vehicles so much they often forget or are tempted to disregard the boundaries placed on them for driving these vehicles. As a result many children are injured each year because they accidentally drive a child sized electrically powered vehicle outside of the boundary area dictated by their parents. It would be a benefit, therefore, to have a child sized, electrically powered vehicle that included a containment system that prevented a child from driving the vehicle across a predefined boundary perimeter. It would be a further benefit to have such a child sized, electrically powered vehicle with a containment system that included a radio antennae perimeter defining system including at least one radio transmitting antennae that at least partially defined the boundary perimeter by the use of a transmitted radio signal.

SUMMARY OF THE INVENTION

It is thus an object of the invention to provide a powered toy vehicle with containment system.

It is a further object of the invention to provide a powered toy vehicle with containment system that prevents a child from driving the vehicle across a predefined boundary perimeter.

It is a still further object of the invention to provide a powered toy vehicle with containment system that includes a radio antennae perimeter defining system including at least one radio transmitting antennae that at least partially defines the boundary perimeter by the use of a transmitted radio signal.

It is a still further object of the invention to provide a powered toy vehicle that can be driven by a child in a forward and in a reverse direction that includes a direction control switch for selecting from a forward drive capacity or a reverse drive capacity of a reversible electric drive motor and that further includes a containment system including a radio antennae perimeter defining system including at least one radio antennae for transmitting a perimeter defining signal at a first predetermined frequency, a radio receiving circuit that is tuned to receive the first predetermined frequency and detect the perimeter defining signal and that includes a control output in controlling connection with a motor control relay circuit, the motor control relay circuit disabling the forward drive capacity of the reversible electric drive motor during the entire period when the radio receiving circuit detects the perimeter defining signal and enabling the forward drive capacity of the reversible electric drive motor when the perimeter defining signal is not detected by the receiving circuit.

It is a still further object of the invention to provide a powered toy vehicle with containment system that accomplishes some or all of the above objects in combination.

Accordingly, a powered toy vehicle with containment system is provided. The powered toy vehicle with containment system includes a powered toy vehicle that can be driven by a child in a forward and in a reverse direction that includes a direction control switch for selecting from a forward drive capacity or a reverse drive capacity of a reversible electric drive motor; and a containment system including a radio antennae perimeter defining system including at least one radio antennae, for transmitting a perimeter defining signal at a first predetermined frequency, and a radio receiving circuit, tuned to receive the first predetermined frequency and detect the perimeter defining signal and that includes a control output in controlling connection with a motor control relay circuit, the motor control relay circuit disabling the forward drive capacity of the reversible electric drive motor during the entire period when the radio receiving circuit detects the perimeter defining signal and enabling the forward drive capacity of the reversible electric drive motor when the perimeter defining signal is not detected by the receiving circuit. In a preferred embodiment, the toy vehicle is provided with a radio controlled alarm relay circuit activated by a hand held transmitter, the alarm really being connected in series between the battery and the reversible electric motor in a manner such that when the alarm relay is open all power is disconnected from the reversible electric motor. When this embodiment is constructed, a long range hand held transmitter is also preferably provided for allowing a supervising care giver to disable the vehicle should conditions warrant. The radio receiving circuit also preferably includes a sound chip alarm that produces an audible output to signal enablement and disablement of the vehicle.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF THE EXEMPLARY EMBODIMENT

Figure 1:
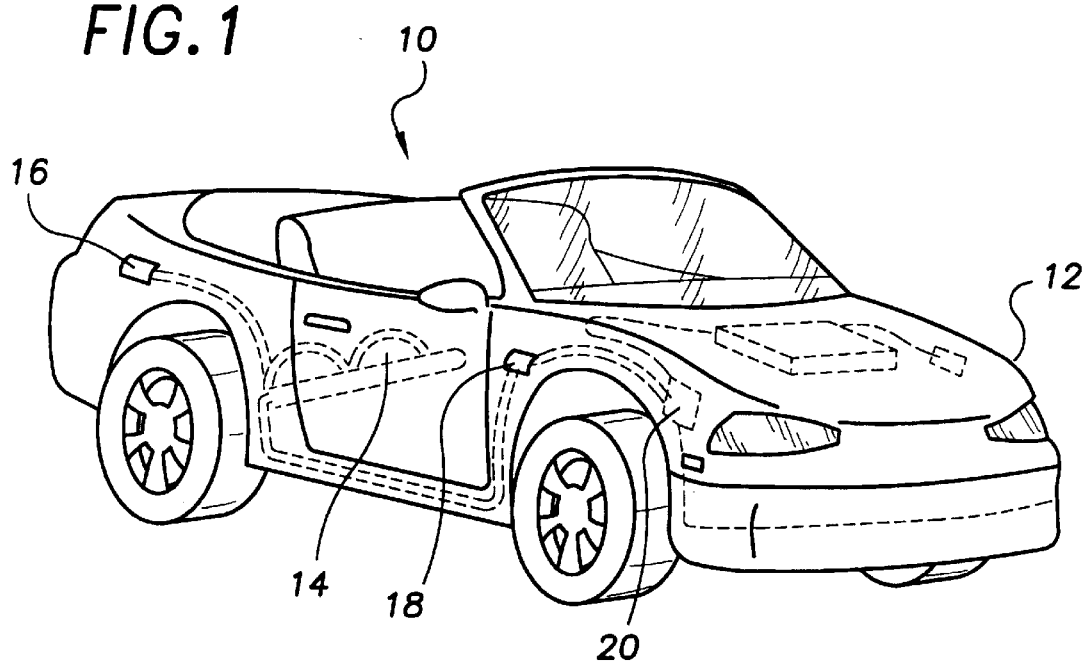
FIG. 1 is a perspective view of an exemplary embodiment of the powered toy vehicle of the powered toy vehicle with containment system of the present invention showing the vehicle body, reversible drive motor, and the battery.
Figure 2:
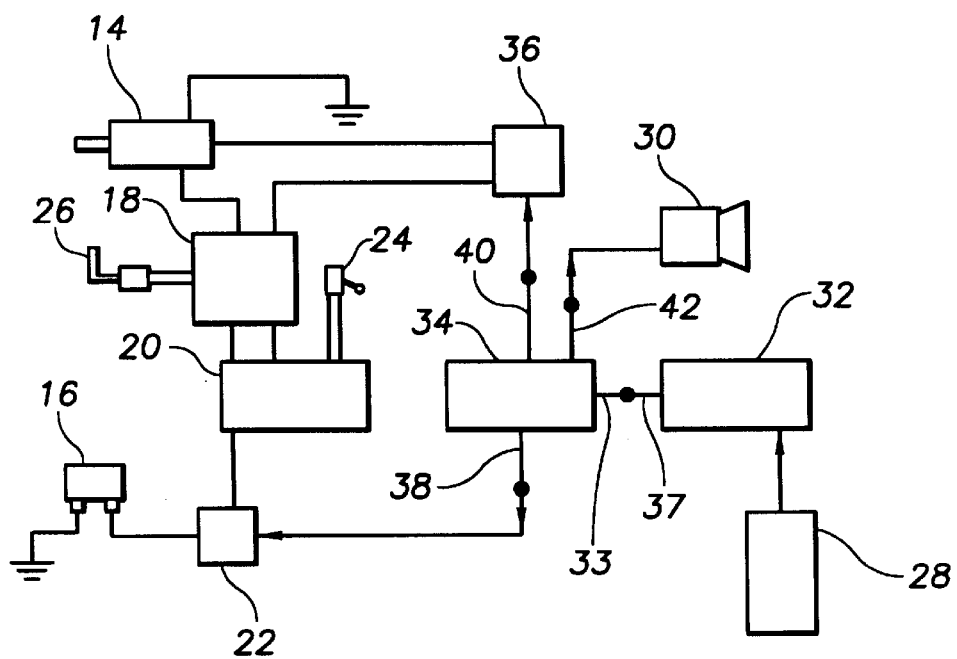
FIG. 2 is a schematic diagram showing the reversible electric motor, the motor speed controller, the motor direction controller, the alarm/power relay, the vehicle battery, the direction control switch, the radio antennae, the speaker, the radio receiver circuit, and the radio signal detection and function selection circuit.

FIG. 1 shows an exemplary embodiment of the powered toy vehicle of the powered toy vehicle with containment system of the present invention generally designated by the numeral 10. Toy vehicle 10 is of conventional construction and includes a vehicle body 12, a reversible drive motor 14, a battery 16, a motor speed controller 18, and a motor direction controller 20. FIG. 2 shows drive motor 14, battery 16, motor speed controller 18, and motor direction controller 20 interconnected with the vehicle mounted elements of the containment system. The vehicle mounted elements of the containment system include an alarm/power relay 22, a direction control switch 24, a foot actuated speed control switch 26, a radio antennae 28, a speaker 30, a radio receiver circuit 32, a radio signal detection and function selection circuit 34, and a forward drive capacity disabling relay 36. Alarm/power relay 22 is a conventional latching relay and forward drive capacity disabling relay 36 is a conventional normally closed relay. Direction control switch 24 is a conventional two position switch. Foot actuated speed control switch 26 is a foot actuated variable resister. Radio antennae 28, radio receiver circuit 32, and radio signal detection and function selection circuit 34 are of conventional construction.

Radio signal detection and function selection circuit 34 has a receiving input 33 in signal receiving connection with a signal output 37 of radio receiving circuit 32; a disable vehicle output 38 in controlling connection with alarm/power relay 22; a forward drive capacity output 40 in controlling connection with forward drive capacity disabling relay 36; and a speaker control output 42 in driving connection with speaker 30. When alarm/power relay 22 is latched open, drive motor 14 of toy vehicle 10 is disabled. When alarm/power relay 22 is latched closed, drive motor 14 of toy vehicle 10 can operate.

Figure 3:
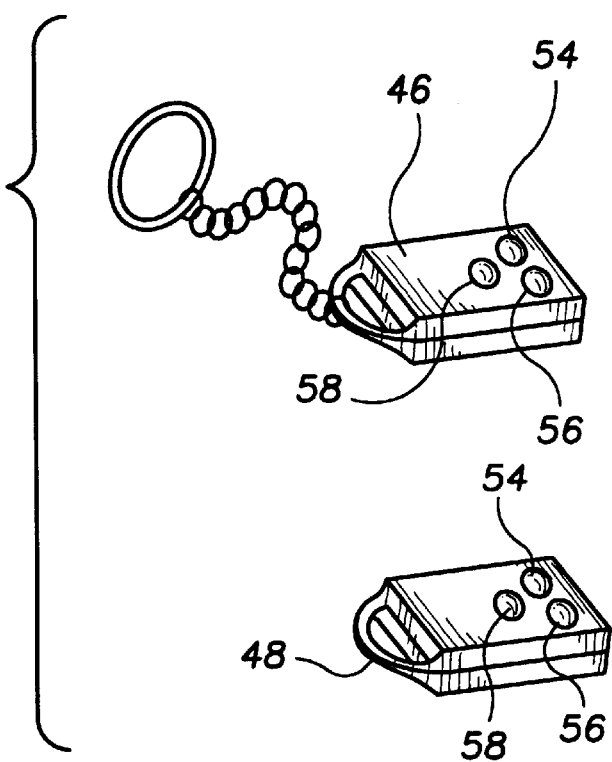
FIG. 3 is a perspective view of exemplary embodiments of the user remote and the supervisory remote.
Figure 4:
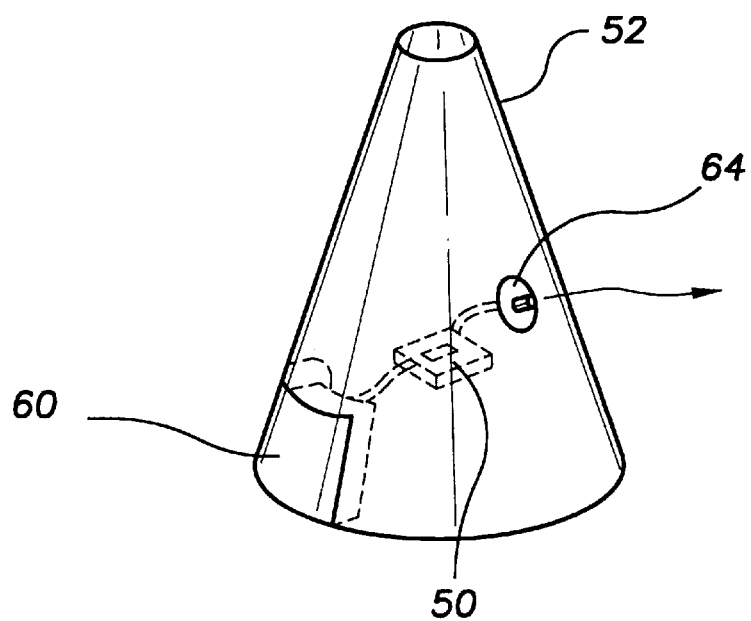
FIG. 4 is a perspective view of an exemplary embodiment of one of the identical perimeter defining radio transmitter pylons showing the pylon housing, the directional antennae, and the transmitter circuit.

Radio receiving circuit 32 is tuned to receive radio signals from a hand held user remote alarm transmitter 46 (FIG. 3), a hand held long distance supervisory remote transmitter 48 (FIG. 3); and a pylon transmitter circuit 50 of a perimeter defining radio transmitter pylon 52 (both shown in FIG. 4). Referring to FIG. 3, hand held user remote alarm transmitter 46 and hand held long distance supervisory remote transmitter 48 are of substantially identical construction except that hand held long distance supervisory remote transmitter 48 has a range of about forty-five feet.

Each remote transmitter 46,48 includes an enable button 54, a disable button 56, and an audible chirp button 58. Depressing enable button 54 results in the latching closed of alarm/power relay 22. Depressing disable button 56 results in the latching open of alarm/power relay 22. Depressing and holding audible chirp button 58 down causes speaker 30 to output an audible chirping sound for as long as audible chirp button 58 is depressed. Hand held long distance supervisory remote transmitter 48 is used to disable toy vehicle 10 when a supervising adult believes a child may be in danger of driving toy vehicle 10 into a dangerous location or situation.

Figure 5:
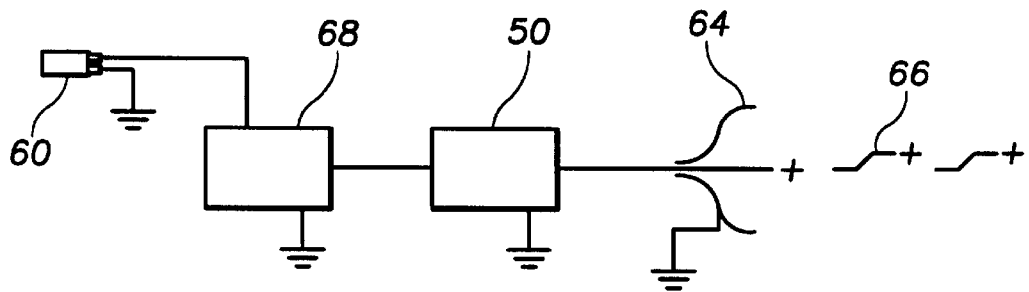
FIG. 5 is a schematic diagram of the radio transmitter showing the transmitting antenna, the power transmitter, the perimeter defining signal generator, and the battery.
Figure 6:
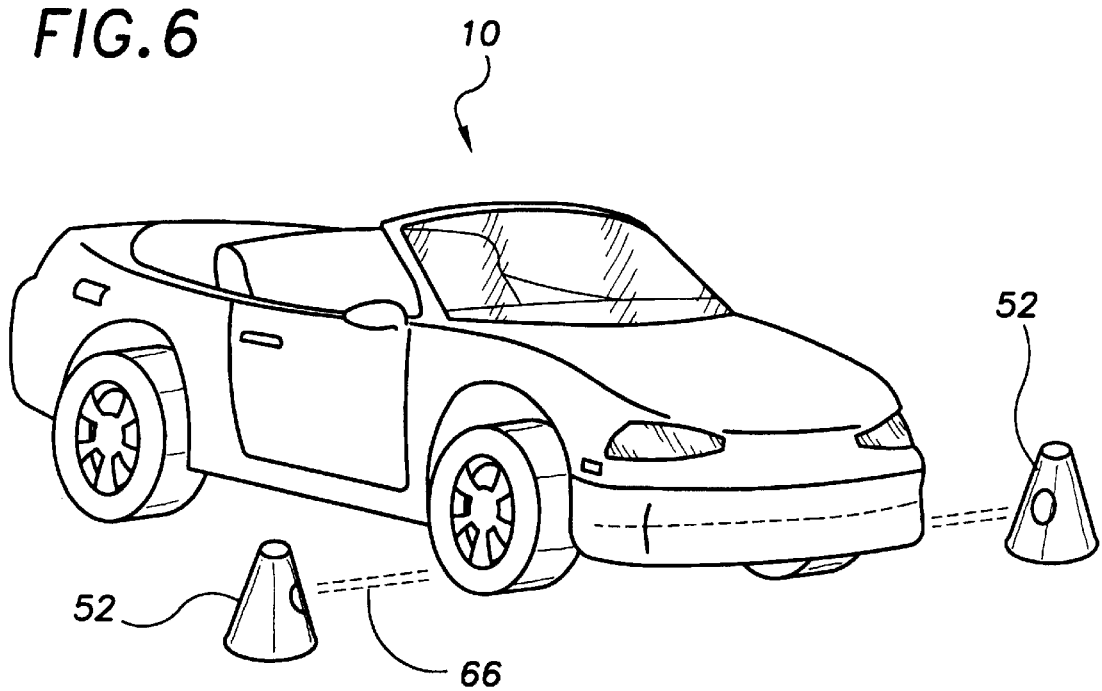
FIG. 6 is a perspective view showing the powered toy vehicle of and two of the perimeter defining radio transmitter pylons of the toy vehicle with containment system of the present invention in use.

Referring now to FIG. 4, perimeter defining radio transmitter pylons 52 are used to define a containment area within which a child can drive toy vehicle 10. Each radio transmitter pylon 52 includes a battery 60, a pylon transmitter circuit 50, and a directional antennae 64. Referring now to FIG. 5, directional antennae 64 focuses and transmits a perimeter defining signal 66 that is generated by a signal generator 68 and pylon transmitter circuit 50 and that is received by radio receiver circuit 32. Referring now to FIG. 6, when toy vehicle 10 is driven close enough to perimeter defining signal 66 to be received, (refering generally now to FIGS. 1–6), forward drive capacity disabling relay 36 is opened preventing toy vehicle 10 from being driven in the forward direction and thus prevents the child from driving through the boundary defined by signal 66. Although the forward driving capacity is disabled, the child is free to switch the drive system into reverse by switching direction control switch 24 to reverse and backing far enough away to prevent reception of signal 66. Once signal 66 is no longer received, forward drive capacity disabling relay 36 is closed once again enabling toy vehicle 10 to be driven in the forward direction.

It can be seen from the preceding description that a powered toy vehicle with containment system has been provided that prevents a child from driving the vehicle across a predefined boundary perimeter; that includes a radio antennae perimeter defining system including at least one radio transmitting antennae that at least partially defines the boundary perimeter by the use of a transmitted radio signal; and that includes a powered toy vehicle that can be driven by a child in a forward and in a reverse direction that includes a direction control switch for selecting from a forward drive capacity or a reverse drive capacity of a reversible electric drive motor and that further includes a containment system including a radio antennae perimeter defining system including at least one radio antennae for transmitting a perimeter defining signal at a first predetermined frequency, a radio receiving circuit that is tuned to receive the first predetermined frequency and detect the perimeter defining signal and that includes a control output in controlling connection with a motor control relay circuit, the motor control relay circuit disabling the forward drive capacity of the reversible electric drive motor during the entire period when the radio receiving circuit detects the perimeter defining signal and enabling the forward drive capacity of the reversible electric drive motor when the perimeter defining signal is not detected by the receiving circuit.

It is noted that the embodiment of the powered toy vehicle with containment system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A powered toy vehicle with containment system comprising:

a powered toy vehicle that can be driven by a child in a forward and in a reverse direction that includes a direction control switch for selecting from a forward drive capacity or a reverse drive capacity of a reversible electric drive motor; and a containment system including a radio antennae perimeter defining system including at least one radio antennae, for transmitting a perimeter defining signal at a first predetermined frequency, and a radio receiving circuit, tuned to receive said first predetermined frequency and detect said perimeter defining signal and that includes a control output in controlling connection with a motor control relay circuit, said motor control relay circuit disabling said forward drive capacity of said reversible electric drive motor during said entire period when said radio receiving circuit detects said perimeter defining signal and enabling said forward drive capacity of said reversible electric drive motor when said perimeter defining signal is not detected by said receiving circuit.

2. The powered toy vehicle with containment system of claim 1, wherein:

said toy vehicle includes:

a hand held radio transmitter; and a radio controlled alarm relay circuit that is activated by said hand held radio transmitter, said alarm relay circuit being connected in series between said battery and said reversible electric motor in a manner such that when said alarm relay is open all power is disconnected from said reversible electric motor.

3. The powered toy vehicle with containment system of claim 2, further including:

a long range hand held radio transmitter, said long range hand held radio transmitter being capable of activating said radio controlled alarm relay circuit.

4. The powered toy vehicle with containment system of claim 2 wherein:

said radio receiving circuit includes a sound chip alarm that produces an audible output to signal enablement and disablement of said toy vehicle.

5. The powered toy vehicle with containment system of claim 3 wherein:

said radio receiving circuit includes a sound chip alarm that produces an audible output to signal enablement and disablement of said toy vehicle.

* * * * *